United States Patent [19]
Suzuki et al.

[11] Patent Number: 5,743,482
[45] Date of Patent: Apr. 28, 1998

[54] PHOTO FILM WINDING METHOD AND APPARATUS

[75] Inventors: Chiaki Suzuki; Takeshi Kanaoka; Takayuki Kambara; Susumu Sato, all of Kanagawa, Japan

[73] Assignee: Fuji Photo Film Co., Ltd., Kanagawa, Japan

[21] Appl. No.: 667,469

[22] Filed: Jun. 21, 1996

[30] Foreign Application Priority Data

Jun. 23, 1995 [JP] Japan .................... 7-157483
Dec. 25, 1995 [JP] Japan .................... 7-337413

[51] Int. Cl.⁶ .................................................. B65H 19/26
[52] U.S. Cl. ............................... 242/533.4; 242/534.2
[58] Field of Search ..................... 242/523.1, 526.1, 242/526.3, 532.1, 532.6, 533.4, 533.5, 533.6, 534.2

[56] References Cited

U.S. PATENT DOCUMENTS

| | | | |
|---|---|---|---|
| 3,411,732 | 11/1968 | Ebneter | 242/533.4 |
| 3,477,657 | 11/1969 | Norbisrath | 242/533.5 |
| 4,609,422 | 9/1986 | Becking | 156/502 |
| 4,846,416 | 7/1989 | Natale | 242/533.5 |
| 4,957,247 | 9/1990 | Nakamura et al. | |
| 5,125,630 | 6/1992 | Hoyt et al. | 242/526.3 |
| 5,479,691 | 1/1996 | Shimizu et al. | 29/430 |

FOREIGN PATENT DOCUMENTS

| | | |
|---|---|---|
| 3-182451 | 8/1991 | Japan . |
| 3182451 | 8/1991 | Japan . |
| 9218900 | 10/1992 | WIPO . |

Primary Examiner—John M. Jillions
Attorney, Agent, or Firm—Sughrue, Mion, Zinn, Macpeak & Seas, PLLC

[57] ABSTRACT

A photo filmstrip (10) has a length from a front end to a rear end (10a), and the length is different according to a strip type. To wind the photo filmstrip about a spool (36), at first, the front end is retained on the spool. The photo filmstrip is wound about the spool at high speed by rotating the spool fast. After the high-speed winding, the photo filmstrip is wound about the spool at low speed by rotating the spool slowly. During the low-speed winding, the rear end is detected at a photo sensor (47, 84, 99) disposed a first distance away from the spool rotated in the low-speed winding. The spool is stopped from rotating upon detecting the rear end, to regularize a length of an unwound portion of the photo filmstrip irrespective of the length of the photo filmstrip.

16 Claims, 6 Drawing Sheets

PHOTO FILM WINDING METHOD AND APPARATUS

BACKGROUND OF THE INVENTION

1. Field of the Invention

The present invention relates to a photo film winding method and apparatus. More particularly, the present invention relates to a method and apparatus for winding photo film about a spool with heightened efficiency.

2. Description Related to the Prior Art 35 mm photo film contained in a cassette has a photo film leader, which is at least partially protruded to the outside of the cassette for engagement with a take-up spool incorporated in a camera which is loaded with the photo film. In a factory manufacturing the photo film, the photo film is wound about a spool in a roll form, but not wound completely. The leader is detected by use of a sensor while the spool is rotated for winding the photo film. The leader is partially left unwound from the spool. If the spool rotation is effected at a high speed, efficiency in production is raised. However it is likely that a length of an unwound portion of the leader is irregular, as time of stop of the spool is inevitably changed.

There are numerous photo film sizes, as there are different values of photo film sensitivity, maximum photographable number of frames and the like. The strip length of the photo film is different according to the maximum photographable number of frames. So is the length of a portion of the photo film inevitably wound about the spool. A prior document JP-A 3-182451 discloses operation of rotating the spool at a high speed and then at a low speed for photo film winding, in order to regularize a length of an unwound portion of the photo film remaining after the winding. Also a time point upon which the spool rotation is changed to the low speed is predetermined differently between the kinds of the photo film.

The apparatus disclosed in the prior document above has data of timing patterns each of which is preset for one kind of the photo film, and in accordance with which rotation of the spool is changed from the high speed to the low speed. When the timing patterns require a change, or when a new kind of photo film is desired in production, the apparatus must be stopped provisionally for the purpose of operation of changing the timing patterns or inputting new information. This is an additional operation inconsistent to raising efficiency of cassette production.

SUMMARY OF THE INVENTION

In view of the foregoing problems, an object of the present invention is to provide method and apparatus for winding photo film about a spool with heightened efficiency without need of stopping operation when a photo film size is required to change.

In order to achieve the above and other objects and advantages of this invention, at first, a front end of a photo filmstrip is retained on the spool, the photo filmstrip being different in a length from the front end to a rear end according to a strip type. The photo filmstrip is wound about the spool at high speed by rotating the spool fast. After the high-speed winding step, the photo filmstrip is wound about the spool at low speed by rotating the spool slowly. During the low-speed winding step, the rear end is detected at a first sensor, the first sensor being disposed a first distance away from the spool rotated in the low-speed winding step. The spool is stopped from rotating upon detecting the rear end in the detecting step, to regularize a length of an unwound portion of the photo filmstrip irrespective of the length of the photo filmstrip.

In a preferred embodiment, the high-speed winding step is effected for a predetermined time irrespective of the strip type, and the predetermined time is enough to wind the photo filmstrip until the rear end of the photo filmstrip of a strip type of a shortest length comes to the first sensor.

In another preferred embodiment, the high-speed winding step is effected until a second sensor detects the rear end, and the second sensor is disposed a second distance away from the spool rotated in the high-speed winding step, where the second distance is longer than the first distance.

In accordance with the present invention, no operation of stopping the manufacturing line is required even when a photo film size is required to change. The photo filmstrip can be wound about a spool with heightened efficiency.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
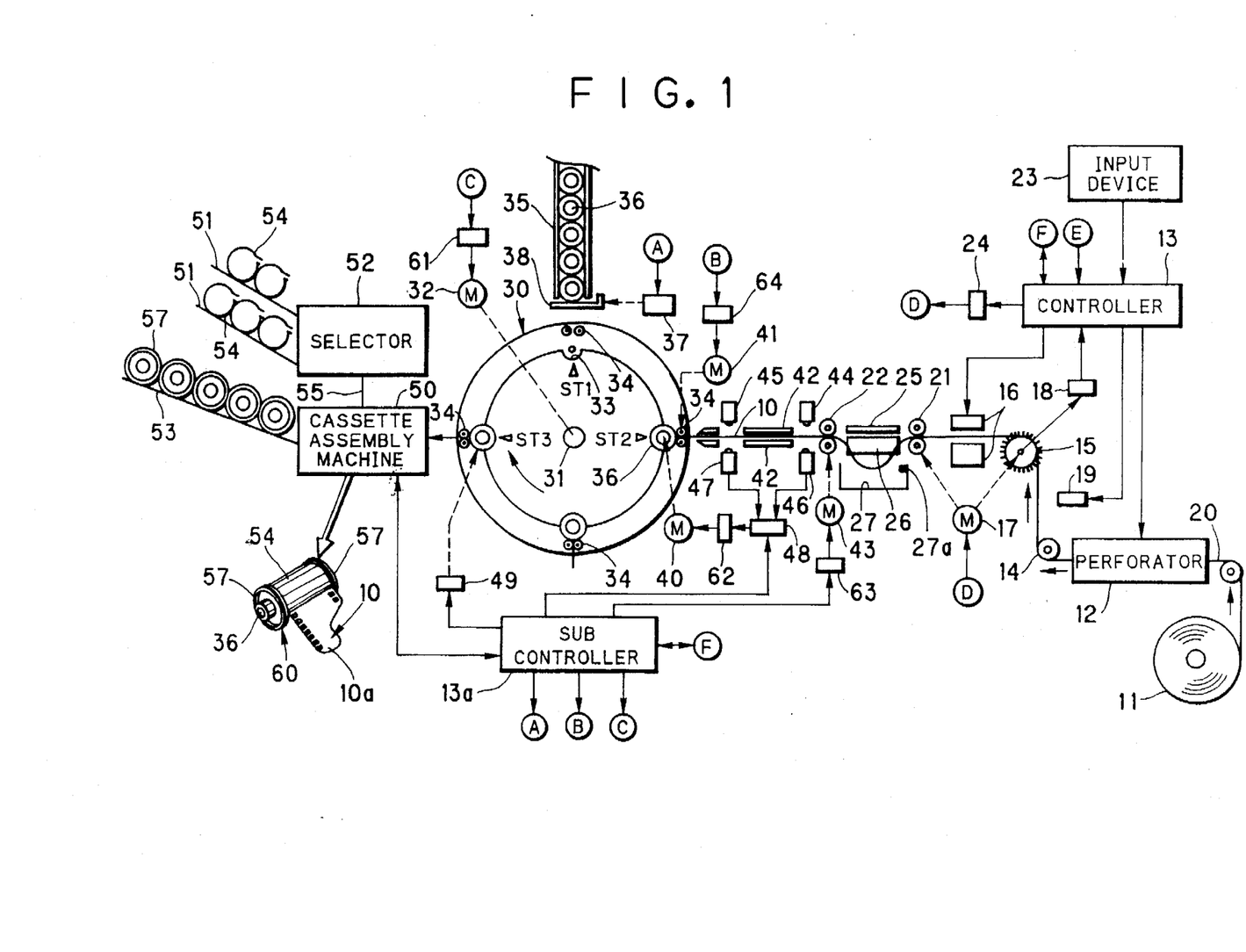
FIG. 1 is a schematic diagram illustrating a photo film winding apparatus.

FIG. 1 illustrates a system for producing a photo film cassette. Continuous photo film 20 is drawn out of a photo film roll 11, and moved to an intermittent perforator 12. The perforator 12 includes plural sets of punches and dies, is controlled by a controller 13, and forms a train of regular perforations along each of edges of the photo film at a regular pitch. The continuous photo film 20 provided with the perforation trains is moved via a roller 14 and a length measuring roller 15, and to a trimmer 16.

The length measuring roller 15 is a sprocket wheel in mesh with the perforations of the continuous photo film 20. The length measuring roller 15 is rotated by a motor 17, and conveys the continuous photo film 20 to the trimmer 16. A rotary encoder 18 is connected to the length measuring roller 15, and generates a pulse each time the length measuring roller 15 rotates as much as a predetermined angle. Pulses from the length measuring roller 15 are counted by the controller 13, to measure a conveying amount of the continuous photo film 20.

A side printer 19 is disposed between the roller 14 and the length measuring roller 15. The side printer 19 imprints an information pattern to edge portions of the continuous photo film 20 to provide the continuous photo film 20 with latent images of DX bar codes, frame numbers, frame number bar codes, a trade name and the like in accordance with the photo film size. The imprinted information pattern is visualized by developing a photo film strip 10 after exposures. Examples of the photo film size are 36-exposure, 24-exposure and 12-exposure sizes. The photo film length is defined by the photo film sizes. The photo film of the 36-exposure size has the greatest length.

The trimmer 16 includes movable and stationary blades, cuts the continuous photo film 20 into the photo film strip 10 at a predetermined length in accordance with size information.

The trimmer 16, in operation, cuts the photo film strip 10 from the continuous photo film 20 while shaping a rear end 10a of the photo film strip 10 into a photo film leader, and shaping a front end of next strip of the photo film into a photo film trailer. At the same time as the cutting, holes for retention to the spool are cut in the front end. The term "rear end" of the photo film strip 10 is used to refer to the leader to lie outside the roll of the photo film when wound. The term "front end" of the photo film strip 10 is used to refer to the trailer retained to the spool to lie inside the roll. The front end of the photo film strip 10 as cut out by the trimmer 16 is moved by a first pair of feed rollers 21 toward a second pair of feed rollers 22.

The photo film size is input to the controller 13 through an input device 23. The controller 13 designates information to be imprinted in accordance with the photo film size in the form of the information pattern. The controller 13 refers to the signal from the rotary encoder 18, actuates the side printer 19, and imprints the information pattern including the frame numbers, the DX code and the like in the predetermined positions.

The controller 13 causes a driver 24 to drive the motor 17. The motor 17 is connected to a speed reducer, via which the motor 17 rotates the length measuring roller 15 and the first pair of feed rollers 21. The controller 13 stops the motor 17 when the continuous photo film 20 is conveyed as much as associated with the designated photo film size. After the motor 17 is stopped, the controller 13 actuates the trimmer 16.

There are disposed an upper stationary guide plate 25 and a downward movable guide plate 26 between the first pair of feed rollers 21 and the second pair of feed rollers 22. The movable plate 26 includes two flaps, which are swung about respective axes extended in the photo film conveying direction, and swung perpendicularly to the plane of the drawing. The two flaps are doors to close an entrance of a photo film loop chamber 27, where a looped portion of the photo film is contained.

The winding apparatus of the present invention includes an indexing drum or turret 30, a stacker 35 as spool supplier, a spool rotator device, a speed changer, a wind stop device, a nip roller driver, a spool remover 49, a cassette assembly machine 50 and a selector 52. Those are controlled comprehensively by a sub controller 13a. The controller 13 inputs information of the photo film size to the sub controller 13a. A control signal is sent and returned between the controller 13 and the sub controller 13a, which synchronize conveyance of the photo film.

The indexing drum 30 is mounted about a shaft 31 in rotatable fashion, and rotated by a motor 32 intermittently by 90 degrees. The indexing drum 30 has four (4) spool holders 33. There are disposed pairs of nip rollers 34 each pair of which is associated with one of the spool holders 33. Each of the nip rollers 34 applies sufficient tension to the photo film while the spool is rotated for photo film winding.

In the station ST1, a spool 36 supplied from the stacker 35 is set into the associated one of the spool holders 33. Under the stacker 35 is disposed a shutter 38, which is opened/closed by an actuator 37. The shutter 38 operates to take out the single spool 36 from the stacker 35.

The spool 36 includes a spool core and two flanges formed integrally with the spool core. The spool core has a slot into which a front end of the photo film is inserted. Also the spool core has hooks formed inside the slot. There are holes which are formed in the front end of the photo film, and retained by the hooks of the spool core. The slot and the hooks are such disclosed in U.S. Pat. No. 5,479,691. The photo film is wound about the spool core and between the flanges.

In the station ST2, a spool drive shaft is shifted and coupled to the spool 36. The spool drive shaft is connected to a motor 40 via a speed reducer. The motor 40, the speed reducer and the spool drive shaft consists a unit for winding the photo film. Also in the station ST2, a nip roller drive mechanism is connected to the one associated pair of nip rollers 34. The nip roller drive mechanism includes a connector, clutch, a speed reducer and a motor 41.

The second pair of feed rollers 22 are rotated by a motor 43 via a speed reducer, and convey the photo film to the station ST2 of the indexing drum 30. In the present embodiment, the trimmer 16 cuts the photo film strip 10 from the continuous photo film 20 while the spool is rotating, as is described later in detail. Of course the present invention is applicable to a construction where the trimmer 16 cuts the photo film strip 10 from the continuous photo film 20 after the photo film is retained on the spool and/or before the spool is rotating. It is possible to move the photo film past the second pair of feed rollers 22 both before and after the photo film strip 10 is cut from the continuous photo film 20. This depends on the position of the trimmer 16 and a designated one of the photo film sizes.

There are photo film guide plates 42 disposed between the second pair of feed rollers 22 and the station ST2 to define a path between them for the photo film conveyance. A photo sensor 46 is disposed upstream from the guide plates 42. A photo sensor 47 is disposed downstream from the guide plates 42. The photo sensor 46 receives an infrared beam from an infrared light source 44. The photo sensor 47 receives an infrared beam from an infrared light source 45. The photo sensor 46 outputs "Low" signal to a motor controller 48 when the photo film strip 10 exists in front of the photo sensor 46, and outputs "High" signal to the same when the photo film strip 10 does not exist in front of the photo sensor 46. The photo sensor 47 is similar to the photo sensor 46 in connection and operation. When the motor controller 48 detects change of the output from the photo sensor 46 from the Low to the High, the motor controller 48 judges that the rear end 10a of the photo film strip 10 has passed the photo sensor 46. The photo sensor 46, the photo sensor 47 and the motor controller 48 constitute a speed changer and a wind stop device of the present invention.

The motor controller 48 detects passage of the rear end 10a of the photo film strip 10 in accordance with an output from the photo sensor 46. In response the motor controller 48 changes the speed of the motor 40 from the high speed to the low speed. In the low-speed rotation, the photo sensor 47 detects passage of the rear end 10a of the photo film strip 10. Responsively rotation of the motor 40 is stopped. The rear end 10a of the photo film strip 10 has not been wound on the spool 36, but stands nipped between the one associated pair of nip rollers 34. The unwound portion is protruded from the cassette as a photo film leader. Note that the position of the photo sensor 47 relative to the spool 36 in the station ST2 is predetermined in consideration of the protruded length of the unwound portion.

In the station ST3, the spool 36 with the photo film strip 10 wound thereabout is removed by the spool remover 49, and transferred to the cassette assembly machine 50. To the cassette assembly machine 50, plural cassette hoppers 51, the selector 52, a cap hopper 53 and the like are connected. The cassette hoppers 51 are respectively used for supplying cassettes of plural kinds in combination with the photo film sizes. The cassette hoppers 51 respectively contain plural cassette shells 54, each of which consists of a thin metal plate rolled in cylindrical fashion, and on each of which a DX code, a manufacturer's name and the like are printed in association with the photo film size.

The controller 13 actuates the selector 52 in accordance with the photo film size designated through the input device 23, and selects an associated one of the cassette hoppers 51. The cassette shell 54 is consecutively supplied to the cassette assembly machine 50 through a chute 55 one after another from the cassette hopper 51. The cap hopper 53 supplies the cassette assembly machine 50 also with caps 57, two caps at one time.

The cassette assembly machine 50 inserts the spool having the photo film strip 10 into the cassette shell 54 in the longitudinal direction, and then fits the caps 57 on to ends of the cassette shell 54, finally to produce a photo film cassette 60.

Operation of the system for manufacturing the photo film cassette 60 is described now. The photo film size is input through the input device 23. The size information is sent to the sub controller 13a. The sub controller 13a receives command or information from the controller 13, and responsively actuates the selector 52, to designate one of the cassette hoppers 51. The controller 13 also determines information to be imprinted in accordance with the photo film size, and the length at which the photo film strip 10 is cut from the continuous photo film 20.

When a system start command is input to the controller 13, the continuous photo film 20 starts being treated for finally producing the photo film strip 10. The continuous photo film 20 drawn from the roll 11 is passed through the perforator 12, and provided with two regular trains of perforations along photo film edges. The side printer 19 imprints the frame numbers, DX codes and the like on the edge portions of the continuous photo film 20 in accordance with the photo film size.

The length measuring roller 15 is rotated by the motor 17. Teeth about the length measuring roller 15 is in mesh with the perforations, and conveys the continuous photo film 20. The controller 13 counts pulses from the rotary encoder 18. When a count of the pulses comes up to a value associated with the photo film size, the motor 17 is stopped provisionally. Afterwards, the trimmer 16 is actuated for operation of cutting into the photo film strip 10 and working for the shapes of the front end and the rear end 10a. After the trimmer 16 is actuated, one roller of the first pair of feed rollers 21 is shifted. The photo film strip 10 is released from being nipped by the first pair of feed rollers 21.

The sub controller 13a responds to a signal from the controller 13, and drives the actuator 37 to open/close the shutter 38. The spool 36 is taken out of the stacker 35, and entered into one of the spool holders 33 located in the station ST1. After the entry of the spool 36, the sub controller 13a controls a driver 61 to drive the motor 32. The indexing drum 30 makes a ¼ rotation. The associated one of the spool holders 33 with the spool 36 is set into the station ST2, to stand by for winding the photo film. In the station ST1, an empty one of the spool holders 33 is set. Another single spool 36 is set to the associated one of the spool holders 33 in operation of the shutter 38.

The controller 13 keeps the motor 17 stopped after actuation of the trimmer 16. Upon receiving a standby signal from the sub controller 13a, the controller 13 causes the first pair of feed rollers 21 to nip the photo film, and causes the motor 17 to rotate. Accordingly the length measuring roller 15 and the first pair of feed rollers 21 are rotated at a regular speed, to convey the continuous photo film 20.

The continuous photo film 20 is passed between the guide plates 25 and 26, and conveyed toward the second pair of feed rollers 22. Upon a lapse of time sufficient for movement of the front end of the continuous photo film 20 past the second pair of feed rollers 22, the movable plate 26 is swung to open the loop chamber 27.

When the front end of the continuous photo film 20 comes to the second pair of feed rollers 22, the sub controller 13a causes one of the second pair of feed rollers 22 to shift to nip the front end of the continuous photo film 20. A driver 63 is controlled to drive the motor 43, to rotate the second pair of feed rollers 22. The continuous photo film 20 conveyed by the second pair of feed rollers 22 is passed between the guide plates 42, and sent to the one associated pair of nip rollers 34 located in the station ST2. The sub controller 13a brings the connector mechanism into connection, and then drives the motor 41 via a driver 64, to cause the one associated pair of nip rollers 34 to nip the front end of the continuous photo film 20. The one associated pair of nip rollers 34 is rotated as much as a predetermined amount, to insert the front end of the continuous photo film 20 into the slot in the spool 36. The holes in the front end of the continuous photo film 20 is retained on the hooks in the slot.

When the front end of the continuous photo film 20 is retained inside the slot, the sub controller 13a releases the one associated pair of nip rollers 34 from connection to the motor 41, and causes the one associated pair of nip rollers 34 to nip the continuous photo film 20, to apply adequate tension to the continuous photo film 20 during the winding about the spool. The sub controller 13a causes one of the second pair of feed rollers 22 to shift away from the other of the second pair of feed rollers 22, to release the second pair of feed rollers 22 from nipping of the continuous photo film 20. As the continuous photo film 20 is conveyed by the first pair of feed rollers 21 continuously, a loop of the continuous photo film 20 is formed in the loop chamber 27.

When the photo film loop in the loop chamber 27 is enlarged sufficiently, a signal from a loop detector 27a is sent to the sub controller 13a. The sub controller 13a causes the spool drive shaft to shift for engagement with the spool 36 set in the station ST2, and commands the motor controller 48 to rotate the motor 40 at the high speed. The motor controller 48 causes a driver 62 to rotate the motor 40 at the high speed. The spool drive shaft connected to the motor 40 rotates the spool 36 fast in the winding direction, to wind the continuous photo film 20 about the spool 36. The conveying speed of the first pair of feed rollers 21 is considerably greater than winding speed of the spool 36, so that the photo film loop in the loop chamber 27 is further enlarged.

During the rotation of the spool, the length measuring roller 15 is still conveying the continuous photo film 20. When the continuous photo film 20 is conveyed as much as associated with the photo film size, the controller 13 stops the motor 17 provisionally. Then the controller 13 actuates the trimmer 16 to cut the continuous photo film 20 into the photo film strip 10 at the photo film size.

After actuation of the trimmer 16, the first pair of feed rollers 21 stand stopped in a status of not nipping the photo film 10. In the high-speed rotation of the spool, the looped amount in the loop chamber 27 is decreased. The rear end 10a of the photo film strip 10 is moved past the first pair of feed rollers 21 and then the second pair of feed rollers 22.

When the rear end 10a of the photo film strip 10 is detected by the photo sensor 46, the motor controller 48 changes the rotation of the motor 40 from the high speed to the low. The spool 36 winds the photo film strip 10 at the low speed. During the rotation, the rear end 10a of the photo film strip 10 is detected by the photo sensor 47. The motor controller 48 responsively stops driving the motor 40. The rear end 10a of the photo film strip 10 remains nipped between the one associated pair of nip rollers 34. The length of the unwound portion of the photo film strip 10 about the spool 36 is constant, irrespective of the photo film size.

After the motor 40 is stopped, the motor controller 48 sends the sub controller 13a a wind finish signal representing a finish of the winding. The sub controller 13a drives the motor 32, to cause the indexing drum 30 to make a ¼ rotation. The associated one of the spool holders 33 with the spool 36 inserted in the station ST1 is set in the station ST2. At the same time the associated one of the spool holders 33 with the spool 36 on which the photo film strip 10 is wound is set in the station ST3. In the station ST3, the spool remover 49 removes the spool 36 with the photo film strip 10, and transfers the spool 36 to the cassette assembly machine 50.

The sub controller 13a causes the indexing drum 30 to rotate, and then sends a standby signal to the controller 13. Upon receiving the standby signal from the sub controller 13a, the controller 13 controls movement of the movable plate 26 to close the loop chamber 27. The controller 13 causes the first pair of feed rollers 21 to nip the continuous photo film 20, and causes the motor 17 to rotate again. As described above, the continuous photo film 20 is conveyed to the indexing drum 30.

In the cassette assembly machine 50, the cassette shell 54 is being supplied as selected by the selector 52. The spool 36 on which the photo film strip 10 is wound is inserted into the cassette shell 54. The caps 57 supplied from the cap hopper 53 are fitted respectively on the ends of the cassette shell 54 with the spool 36 supported in rotatable fashion. The cassette assembly machine 50 is controlled by the sub controller 13a for final assemblage of the photo film cassette 60. In the photo film cassette 60, the photo film leader which is the rear end 10a of the photo film strip 10 is protruded outwards at the length irrespective of the photo film size.

The controller 13 and the sub controller 13a are operated in synchronism, and effects the working of the continuous photo film into the photo film strip, the winding to the spool 36, and assembly of the cassette.

When the photo film size is desired to change, information of a new size is input through the input device 23. With the photo film size changed, the selector 52 is driven to set at a new one of the cassette hoppers 51. A new information pattern is also designated. The length at which the photo film is cut by the trimmer 16 is changed in accordance with the photo film size. However there is no change in the sequence of the winding about the spool by the motor 40: the spool remover 49 is driven at the high speed before the photo sensor 46 detects the rear end 10a of the photo film strip 10. Upon detection, the motor 40 is changed over to the high-speed rotation. Upon detection of the rear end 10a at the photo sensor 47, the motor 40 is stopped to finish the winding about the spool.

In the above embodiment, the spool is exited in the station different from the station where the spool is supplied. The present invention is applicable to a construction of FIG. 2 in which the spool is exited in the station where another spool is supplied for another strip of photo film.

Figure 2:
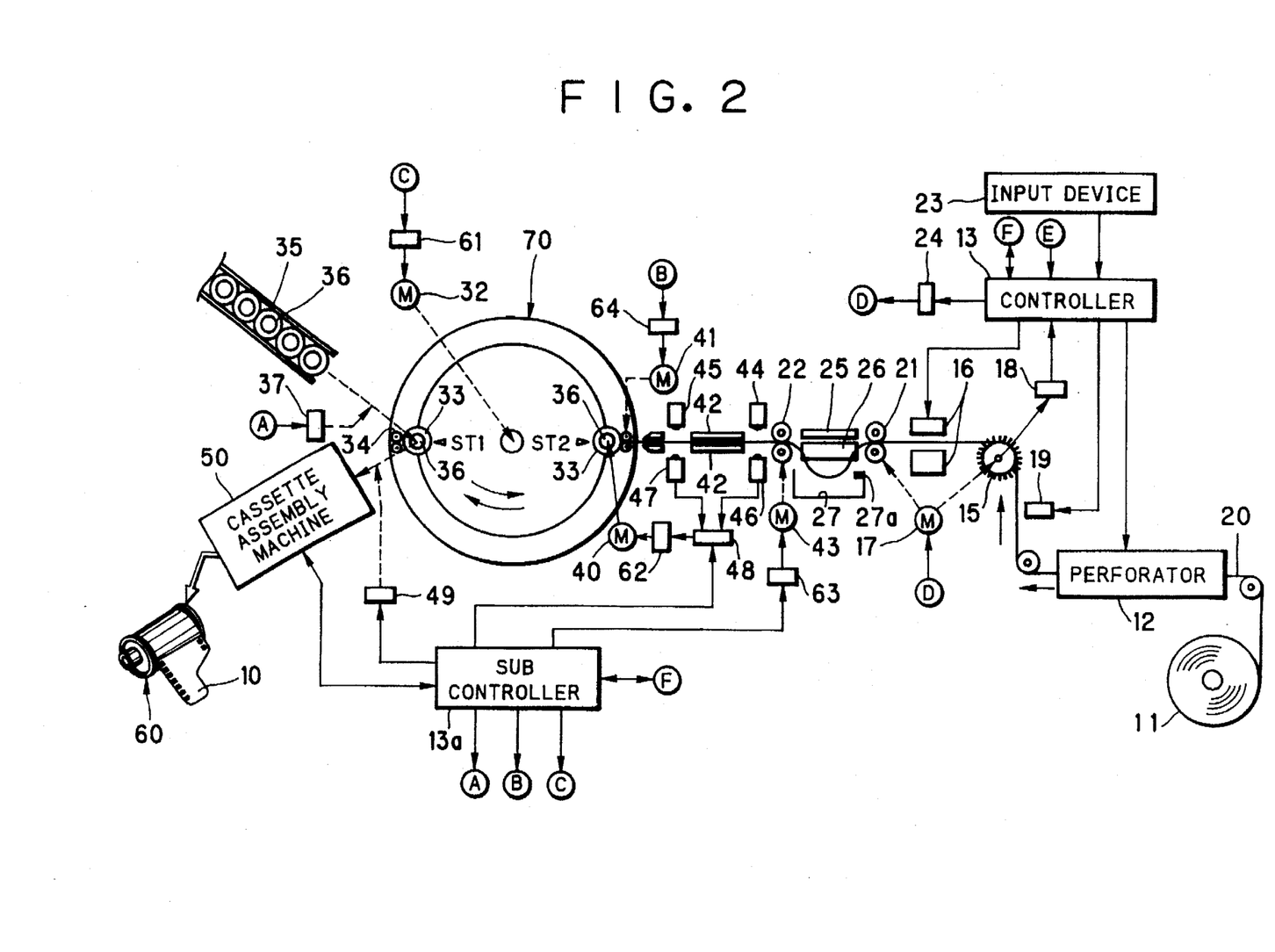
FIG. 2 is a schematic diagram illustrating another preferred photo film winding apparatus having two spool holders about an indexing drum.

In FIG. 2, an indexing drum 70 including the two spool holders 33 is used. The spool holders 33 are relatively positioned at an interval of half a rotation. In the station ST1, the spool 36 supplied from the stacker 35 is set in the associated one of the spool holders 33. When the spool 36 is set in the station ST2, operation of retaining and winding the photo film about the spool 36 is effected. Again the spool 36 is set in the station ST1, where the spool 36 about which the photo film strip 10 is wound is removed by the spool remover 49. A new spool 36 is supplied from the stacker 35 and set in the associated one of the spool holders 33.

Figure 3:
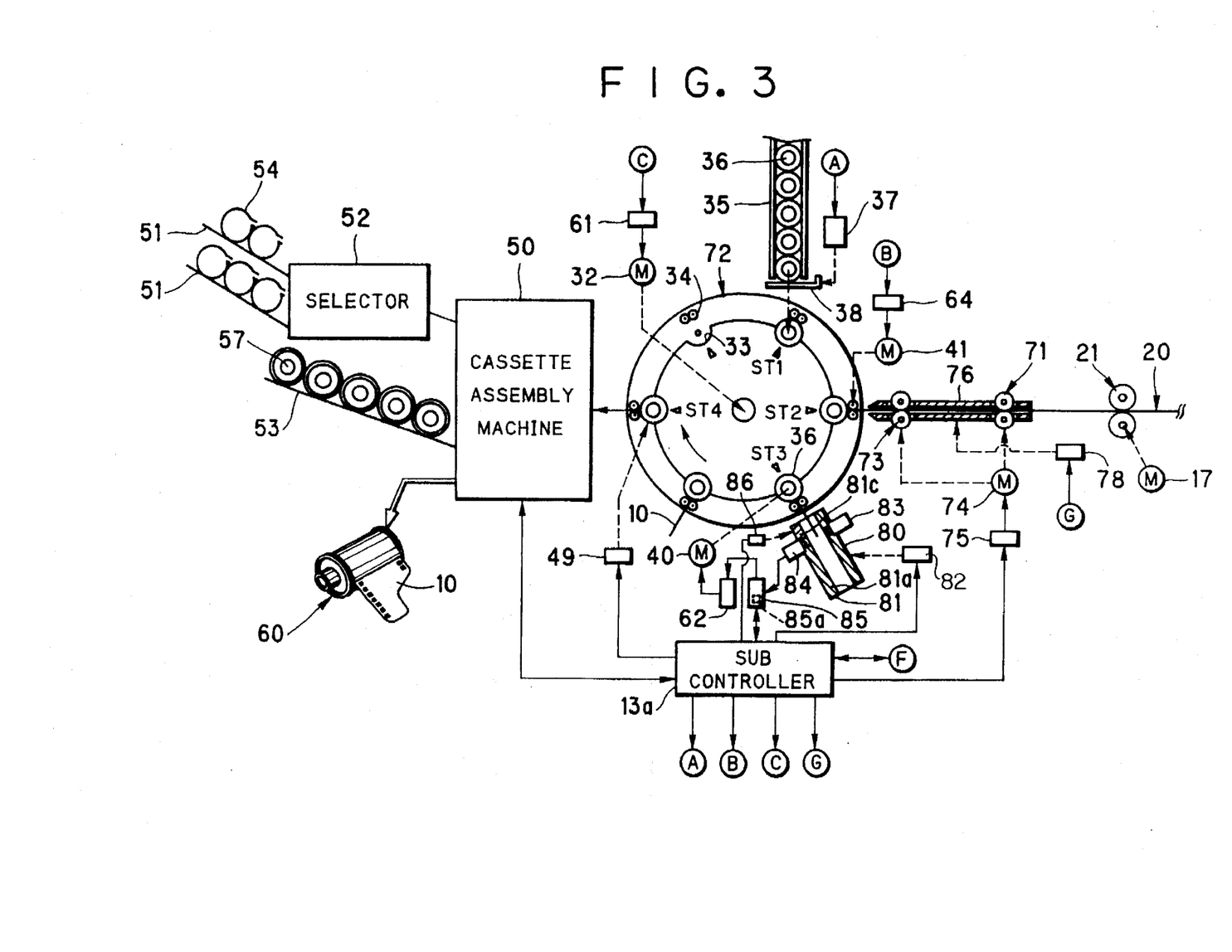
FIG. 3 is a schematic diagram illustrating a preferred photo film winding apparatus where a photo film winding station is separate from a photo film retaining station.

FIG. 3 illustrates another preferred embodiment, in which the spool rotation is effected in a station separate from a station for the front end retention, for the purpose of shortening cycle time of the winding apparatus. Elements similar to the above embodiments are designated with identical reference numerals. An indexing drum 72 caused by the motor 32 to make a ⅙ rotation between intervals included in intermittent rotation. The indexing drum 72 has the six spool holders 33 every 60 degrees.

In the station ST1, the spool 36 supplied from the stacker 35 is set into the associated one of the spool holders 33. The spool 36 set in the station ST2 receives insertion of the continuous photo film 20, of which the front end is retained on the spool 36. In the present embodiment, the loop chamber 27 in FIG. 1 is not included. Two pairs of feed rollers 71 and 73 are disposed in rotatable fashion, spaced at a predetermined interval, and supported on an upper plate 76 and a lower movable plate 77 downstream from the first pair of feed rollers 21. When the pairs of feed rollers 71 and 73 rotate, the continuous photo film 20 is conveyed between the upper and lower plates 76 and 77.

The pairs of feed rollers 71 and 73 are rotated by a motor via a speed reducer. A motor 74 is controlled by the sub controller 13a via a driver 75. The lower plate 77 includes two blades 77a and 77b (See FIGS. 4 and 5), which are opened/closed by swinging about respective axes 77c and 77d extended in the photo film conveying direction, and swung perpendicularly to the drawing plane of FIG. 3. The blades 77a and 77b define an entrance of a photo film loop chamber, where a looped portion of the photo film is contained while the blades 77a and 77b are opened. An opener mechanism 78 is driven to close the blades 77a and 77b, to form a photo film path. After operation of the trimmer 16, the sub controller 13a controls the opener mechanism 78 to shift open the lower plate 77. The indexing drum 72 is rotated in fashion of the tract system, before the lower plate 77 is returned to the closed position.

In the station ST3, the photo film strip 10 is wound on the spool 36 by a spool rotator device, a speed changer and a wind stop device. The spool rotator device includes the motor 40, the speed reducer, and the spool drive shaft, which is shifted and coupled to the spool 36. The spool drive shaft is connected to the motor 40 via the speed reducer.

Figure 6:
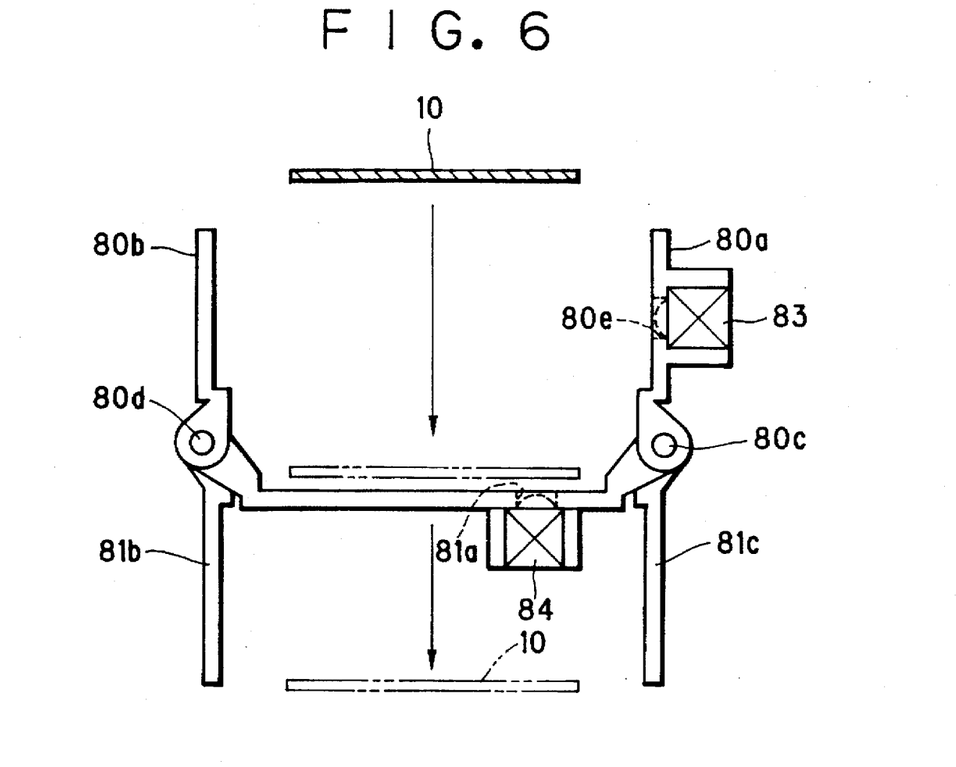
FIG. 6 is a cross section illustrating a closed position of a downstream plate for the photo film winding station.
Figure 7:
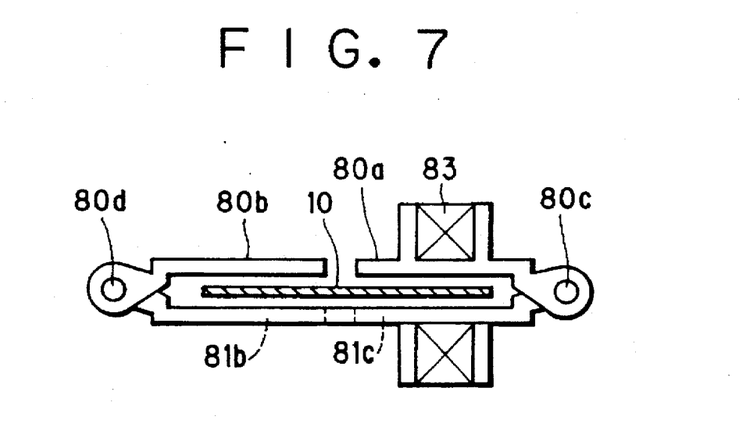
FIG. 7 is a cross section illustrating an open position of the downstream plate.

In the station ST3, upstream and downstream plates 80 and 81 are disposed to extend in a radial direction of the indexing drum 72. The upstream and downstream plates 80 and 81 guide the photo film strip 10 moved to be wound, and have a tunnel shape. The upstream plate 80 closer to the station ST2 includes two blades 80a and 80b as illustrated in FIGS. 6 and 7. The blades 80a and 80b are open/closed when swung about axes 80c and 80d directed in a radial direction of the indexing drum 72. The blades 80a and 80b are moved by an opener mechanism 82 between closed and open positions. In the closed position, the blades 80a and 80b define a photo film path between them. In the open position, the downstream plate 81 receives the photo film strip 10 moved down from the station ST2. The sub controller 13a causes the lower plate 77 to move to the open position, when or before the sub controller 13a causes the upstream plate 80 to move to the open position. After the indexing drum 72 is rotated in fashion of the tract system, the upstream plate 80 is returned to the closed position. On the upstream plate 80 is fixed an infrared light source 83 for emanating an infrared beam.

The downstream plate 81 includes two inner movable blades 81b and 81c and an outer stationary blade 81a, which is disposed farther from the indexing drum 72 than the movable blades 81b and 81c. The movable blades 81b and 81c are closed by an opener mechanism 86 to define a photo film path, and opened to allow directing the rear end 10a of the photo film strip 10 toward the station ST4 from the station ST3. When the sub controller 13a receives a motor stop signal from the driver 62 for stopping the motor 40, the sub controller 13a causes the movable blades 81b and 81c to rotate to the open position. Upon a lapse of a predetermined time after rotating the indexing drum 72, the sub controller 13a causes the movable blades 81b and 81c to return to the closed position.

On the stationary blade 81a, there is a photo sensor 84 for receiving the infrared beam from the infrared light source 83. The photo sensor 84 outputs "Low" signal to a motor controller 85 when the photo film strip 10 exists between the upstream and downstream plates 80 and 81, and outputs "High" signal to the same when the photo film strip 10 does not exist between them. When the motor controller 85 detects change of the output from the photo sensor 84 from the Low to the High, the motor controller 85 judges that the rear end 10a of the photo film strip 10 has passed the photo sensor 84.

The sub controller 13a causes the indexing drum 72 to rotate, and sends a start signal for the motor 40 after the spool 36 is set in the station ST3 with the front end retained thereon. In response to the start signal, the motor controller 85 causes the driver 62 to rotate the motor 40 at the high speed. The motor controller 85 has a counter 85a which measures time after the start of the high-speed rotation of the motor 40. When the measured time comes up to predetermined time data as stored, the rotation of the motor 40 is changed from the high speed to the low speed. The predetermined time is irrespective of the various photo film sizes, and based on the smallest one of the photo film sizes, with the smallest number of frames on the photo film strip 10 windable the most readily. In the low-speed rotation, the motor controller 85 stops the motor 40 when the motor controller 85 receives the signal from the photo sensor 84 detecting the rear end 10a of the photo film strip 10. The rear end 10a of the photo film strip 10 is not wound completely but remains unwound for protrusion out of the cassette as leader of the photo film. Note that the position of the photo sensor 84 is predetermined relative to the spool 36 in the station ST3 in consideration of the length of the remaining portion. The photo sensor 84, the counter 85a and the motor controller 85 constitute the speed changer and the wind stop device.

Operation of the embodiment is described now with reference to FIG. 3. The controller 13 receives a standby signal from the sub controller 13a, and responsively causes the first pair of feed rollers 21 to come close to one another. The motor 17 is driven. The length measuring roller 15 and the first pair of feed rollers 21 are rotated at a regular speed, to convey the continuous photo film 20 toward the pairs of feed rollers 71 and 73.

Figure 4:
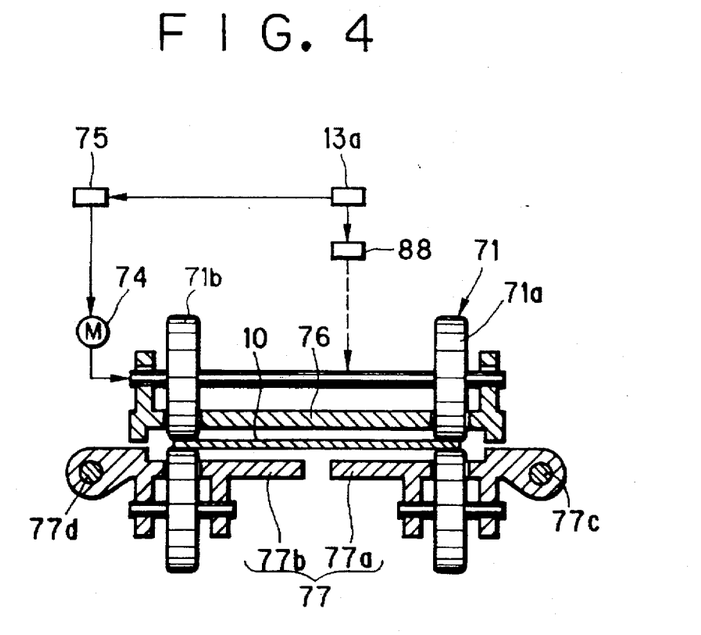
FIG. 4 is a cross section illustrating a closed position of a lower movable plate for the photo film retaining station.

When the front end of the continuous photo film 20 comes to the feed rollers 71, the sub controller 13a controls a shifter mechanism 88 as illustrated in FIG. 4, to move upper rollers 71a and 71b to a nipping position to nip the front end of the continuous photo film 20. Then the sub controller 13a controls the driver 75 to drive the motor 74, so that the feed rollers 71 are rotated. The rotation of the motor 74 is also transmitted to the feed rollers 73. As the pairs of feed rollers 71 and 73 rotate together, the front end of the continuous photo film 20 is passed between the upper and lower plates 76 and 77 and toward the one associated pair of nip rollers 34 located in the station ST2.

The sub controller 13a brings the connector mechanism into connection, and then drives the driver 64 and the motor 41, and causes the one associated pair of nip rollers 34 to nip the front end of the continuous photo film 20. The one associated pair of nip rollers 34 are rotated as much as a predetermined amount, to insert the front end of the continuous photo film 20 into the slot in the spool 36. Holes formed in the front end of the continuous photo film 20 are retained by hooks disposed inside the slot.

Figure 5:
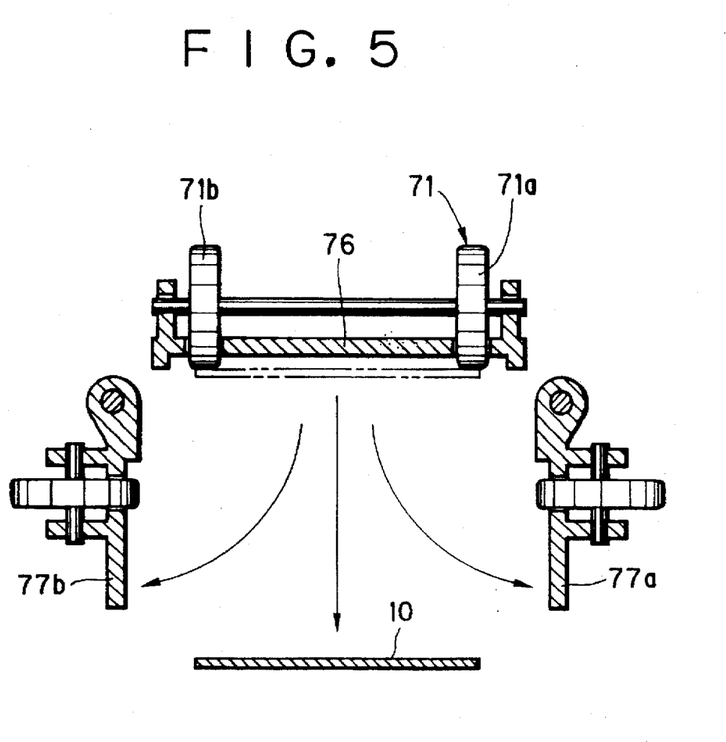
FIG. 5 is a cross section illustrating an open position of the lower movable plate.

When the front end of the continuous photo film 20 is retained to the inside of the slot, the sub controller 13a stops the motor 74 to stop the pairs of feed rollers 71 and 73. The sub controller 13a controls the opener mechanism 78, to shift the lower plate 77 to the open position. The lower plate 77 includes the blades 77a and 77b, which are opened when swung about the axes 77c and 77d by a ¼ rotation as illustrated in FIG. 5. The lower plate 77 and the lower ones of the pairs of feed rollers 71 and 73 are moved away from the continuous photo film 20, of which a portion is looped.

After retention on the spool, the length measuring roller 15 and the first pair of feed rollers 21 convey the continuous photo film 20. When the continuous photo film 20 is conveyed as much as associated with the photo film size, the controller 13 stops the motor 17 provisionally. Then the controller 13 actuates the trimmer 16 to cut the continuous photo film 20 into the photo film strip 10 at the photo film size.

After actuation of the trimmer 16, the controller 13 sends a cut finish signal to the sub controller 13a, and releases the first pair of feed rollers 21 from nipping. In response to the cut finish signal, the sub controller 13a drives the motor 32 which causes the indexing drum 72 to make a ⅙ rotation. The spool 36 with the front end retained is set to the station ST3. As the rear end 10a of the photo film strip 10 is free, the photo film strip 10 comes down in a rotational direction of the indexing drum 72. After rotating the indexing drum 72, the sub controller 13a returns the lower plate 77 to the closed position, and sends a standby signal to the controller 13. The controller 13, in response to the standby signal, causes the length measuring roller 15 and the first pair of feed rollers 21 to rotate, to convey the continuous photo film 20.

Before rotating the indexing drum 72, the sub controller 13a controls the opener mechanism 82 to move the upstream plate 80 in the station ST3 to the open position of FIG. 6. The upstream plate 80 includes the blades 80a and 80b, which are opened when swung about the axes 80c and 80d by a ¼ rotation. The indexing drum 72 is rotated while the upstream plate 80 and the infrared light source 83 are away from the photo film strip 10, which is received by the downstream plate 81.

At a lapse of a predetermined time after rotating the indexing drum 72, the sub controller 13a controls the opener mechanism 82 to return the upstream plate 80 to the closed position of FIG. 7. An optical axis of the infrared light source 83 is moved to coincide with an optical axis of the photo sensor 84 through an opening 80e formed in the upstream plate 80 and the stationary blade 81a in the downstream plate 81. The sub controller 13a, as described above, supplies the motor controller 85 with a drive start signal for the motor 40, which is driven at the high speed for a predetermined time. The photo film strip 10 is moved past the upstream and downstream plates 80 and 81 and wound about the spool 36. When the predetermined time lapses, the rotation of the motor 40 is changed over by the motor controller 85 from the high speed to the low speed. The motor controller 85, during the low-speed rotation, receives a detecting signal from the photo sensor 84 detecting the rear end 10a of the photo film strip 10, and responsively stops the motor 40.

When the winding operation is finished, the motor controller 85 sends a wind finish signal to the sub controller 13a. Responsively the sub controller 13a controls the opener mechanism 82 to move the upstream plate 80 to the open position, and controls the opener mechanism 86 to move the movable blades 81b and 81c to the open position, before causing the indexing drum 72 to rotate. The spool 36 after photo film winding is set to the station ST4. The rear end 10a of the photo film strip 10 is prevented from contacting the downstream plate 81 because the movable blades 81b and 81c are open. Upon the lapse of predetermined time after starting rotation of the indexing drum 72, the rear end 10a of the photo film strip 10 is moved away from the upstream and downstream plates 80 and 81. The sub controller 13a controls the opener mechanism 86 to move the movable blades 81b and 81c to the closed position. It is possible to receive the photo film strip 10 next to come down from the station ST2.

Note that it is unnecessary to fix the infrared light source 83 and the photo sensor 84 on the upstream and downstream plates 80 and 81. It is possible to dispose the infrared light source 83 outside a locus of a swing of the upstream plate 80 and also outside a locus of drop of the photo film strip 10.

In the above embodiment, the spool rotation is changed over from the high speed to the low speed upon the lapse of the predetermined time. The present invention is applicable to a construction in which the perforations in the photo film is counted, and the speed is changed over upon coming of the count up to a predetermined value. In this construction, a counter for counting the perforations can be additionally used. The predetermined value can be preset with reference to the number of the perforations defined in association with the smallest one of the photo film sizes of the photo film strip 10. It is also possible to dispose an encoder in contact with the photo film, to count pulses generated by the encoder, and to determine the length of the photo film portion to be wound.

Figure 8:
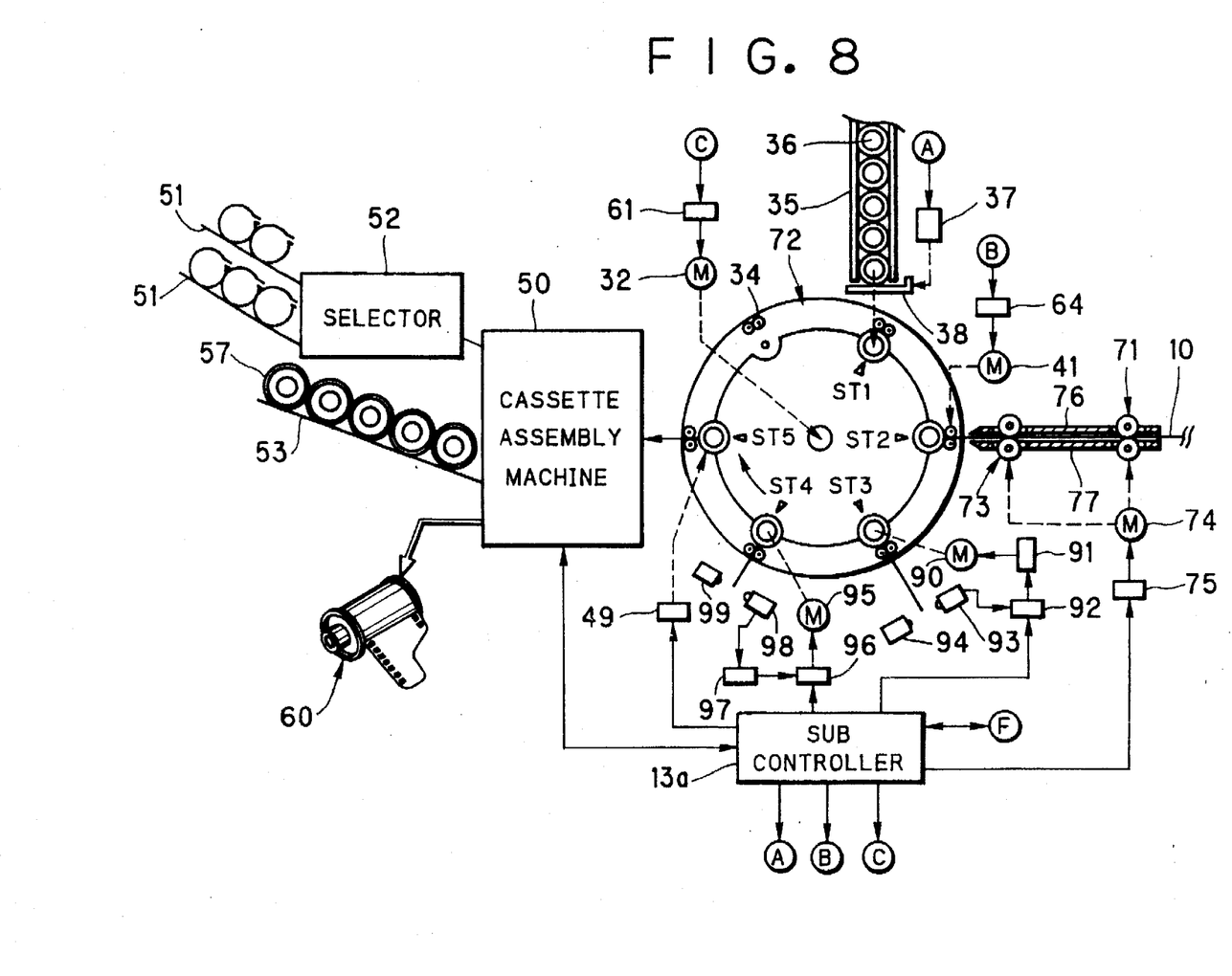
FIG. 8 is a schematic diagram illustrating still another preferred photo film winding apparatus where a low-speed rotating station is separated from a high-speed rotating station.

In the embodiment of FIG. 3, the length of the photo film portion wound at the high speed is regular. However there is a shortcoming typically with the photo film of the greatest size, as the low-speed rotation for the remaining portion requires long time, and is inefficient in the winding operation. FIG. 8 illustrates a preferred embodiment to overcome this shortcoming.

In FIG. 8, the high-speed rotation is effected in the station ST3. The low-speed rotation is effected in the station ST4. The station ST3 has a spool drive shaft, a high-speed rotating motor 90, a driver 91, a motor controller 92, an infrared light source 93 and a photo sensor 94. Those elements constitute a spool rotator device and a wind stop device. The infrared light source 93 and the photo sensor 94 are secured respectively to the upstream plate 80 being openable and to the downstream plate 81 for the film receiving as described by referring to FIGS. 6 and 7. Those plates are eliminated from FIG. 8 for the purpose of simplification and convenience in depiction.

The photo sensor 94 is disposed away from the spool 36 in the station ST3 as much as a predetermined distance. The sub controller 13a causes the upstream plate 80 to move to the closed position after rotating the indexing drum 72. Then a command for driving the high-speed rotating motor 90 is input to the motor controller 92. In response to the command, the motor controller 92 drives the high-speed rotating motor 90 at the high speed via the driver 91. The spool 36 rotates at the high speed, to wind the photo film strip 10. The motor controller 92 receives the detecting signal from the photo sensor 94 for the photo film rear end during the high-speed rotation, and responsively stops the high-speed rotating motor 90. Then the downstream plate 81 is moved to the open position, before the indexing drum 72 is rotated to shift the spool 36 from the station ST3 to the station ST4.

The station ST4 has a spool drive shaft, a low-speed rotating motor 95, a driver 96, a motor controller 97, an infrared light source 98 and a sensor 99. Those elements constitute the spool drive device and the wind stop device. The infrared light source 98 and the photo sensor 99 are secured respectively to the upstream plate 80 being openable and the downstream plate 81 for the film receiving as described with FIGS. 6 and 7. Those are eliminated from FIG. 8 for the purpose of simplification.

The photo sensor 99 is disposed a predetermined distance away from the spool 36 in the station ST4. The distance is set shorter than a distance between the photo sensor 94 and the spool 36 in the station ST3. After the indexing drum 72 is rotated, the sub controller 13a controls the upstream plate 80 to shift to the closed position. Then the sub controller 13a sends a command to the motor controller 97 for driving the low-speed rotating motor 95. The motor controller 97 causes the driver 96 to drive the low-speed rotating motor 95 at the low speed. The spool 36 is rotated at the low speed, to wind the remaining portion of the photo film strip 10 slowly. The motor controller 97, during the rotation, stops the low-speed rotating motor 95 in response to the detecting signal from the photo sensor 99 detecting the photo film rear end. Then the downstream plate 81 is shifted to the open position. The indexing drum 72 is rotated. The spool 36 in the station ST4 is set into the station ST5.

In this preferred embodiment, the two stations are used for the winding respectively at the high speed and at the low speed. It is possible to shorten the time in operation of the tract system. This is essentially effective in heightening the efficiency, as one of the stations about the indexing drum requiring the greatest time uniquely determines the intervals between rotating operations of the indexing drum.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo filmstrip winding method of winding a photo filmstrip about a spool, said photo filmstrip being different in a length from a front end to a rear end according to a strip type, said method comprising steps of:

(A) retaining said front end on said spool;

(B) winding said photo filmstrip about said spool at high speed by rotating said spool fast;

(C) after said step (B), winding said photo filmstrip about said spool at low speed by rotating said spool slowly;

(D) during said step (C), detecting said rear end at a first sensor, said first sensor being disposed a first distance away from said spool rotated in said step (C); and (E) stopping said spool from rotating upon detecting said rear end in said step (D), to regularize a length of an unwound portion of said photo filmstrip irrespective of said length of said photo filmstrip, wherein said step (B) is effected for a predetermined time irrespective of said strip type, and said predetermined time is enough to wind said photo filmstrip until said rear end of said photo filmstrip of a strip type of a shortest length comes to said first sensor.

2. A photo filmstrip winding method as defined in claim 1, wherein said step (B) is effected until a second sensor detects said rear end, and said second sensor is disposed a second distance away from said spool rotated in said step (B), where said second distance is longer than said first distance.

3. A photo filmstrip winding method as defined in claim 1 or 2, further comprising steps of:

(F) setting said spool in a conveyor device;

(G) removing said spool from said conveyor device after said step (E), said spool having said photo filmstrip wound thereabout;

(H) intermittently moving said conveyor device between first and second stations in cyclic fashion, said first station being adapted to effecting said step (G) and said step (F) in series, and said second station being adapted to effecting said steps (A), (B), (C), (D) and (E).

4. A photo filmstrip winding method as defined in claim 1 or 2, further comprising steps of:

(F) setting said spool in a conveyor device;

(G) removing said spool from said conveyor device after said step (E), said spool having said photo filmstrip wound thereabout;

(H) intermittently moving said conveyor device between first, second and third stations in cyclic fashion, said first station being adapted to effecting said step (G), said second station being adapted to effecting said step (F), and said third station being adapted to effecting said steps (A), (B), (C), (D) and (E).

5. A photo filmstrip winding method as defined in claim 1 or 2, further comprising steps of:

(F) setting said spool in a conveyor device;

(G) removing said spool from said conveyor device after said step (E), said spool having said photo filmstrip wound thereabout;

(H) intermittently moving said conveyor device between first, second, third and fourth stations in cyclic fashion, said first station being adapted to effecting said step (G), said second station being adapted to effecting said step (F), said third station being adapted to effecting said step (A), and said fourth station being adapted to effecting said steps (B), (C), (D) and (E).

6. A photo filmstrip winding method as defined in claim 1 or 2, further comprising steps of:

(F) setting said spool in a conveyor device;

(G) removing said spool from said conveyor device after said step (E), said spool having said photo filmstrip wound thereabout;

(H) intermittently moving said conveyor device between first, second, third, fourth and fifth stations in cyclic fashion, said first station being adapted to effecting said step (G), said second station being adapted to effecting said step (F), said third station being adapted to effecting said step (A), said fourth station being adapted to effecting said step (B), and said fifth station being adapted to effecting said steps (C), (D) and (E).

7. A photo filmstrip winding apparatus for winding a photo filmstrip about a spool, said photo filmstrip being supplied in advancement of a front end thereof through a photo film path, and being different in a length from said front end to a rear end according to a strip type, said apparatus comprising:

a retainer device, disposed in an exit of said photo film path, for retaining said front end on said spool;

a rotator device for rotating said spool with said front end retained thereon;

a first sensor, disposed a first distance away from said spool rotated, for detecting said rear end being passed, to generate a detecting signal; and a controller for controlling rotation of said rotator device, said controller causing said rotator device to rotate fast to rotate said spool at high speed in a winding direction, subsequently said controller changing over speed of said rotator device to rotate said spool at low speed in said winding direction, said controller stopping said rotator device upon occurrence of said detecting signal while said spool is rotated slowly, to regularize a length of an unwound portion of said photo filmstrip irrespective of said length of said photo filmstrip;

wherein said controller causes said rotator device to rotate at said high speed for a predetermined time irrespective of said strip type, and said predetermined time is enough to wind said photo filmstrip until said rear end of said photo filmstrip of a strip type of a shortest length comes to said first sensor.

8. A photo filmstrip winding apparatus as defined in claim 7, further comprising a second sensor, disposed a second distance away from said spool rotated at said high speed, for detecting said rear end being passed, to generate a detecting signal, where said second distance is longer than said first distance.

9. A photo filmstrip winding apparatus as defined in claim 7 or 8, further comprising:

a conveyor device for supporting and conveying said spool;

a remover device for removing said spool from said conveyor device, said spool having said photo filmstrip wound thereabout; and a spool supplier device for setting a next spool on said conveyor device after removing said spool.

10. A photo filmstrip winding apparatus as defined in claim 9, wherein said conveyor device intermittently moves between first and second stations in cyclic fashion;

said first station having said remover device and said spool supplier device disposed therein, said spool being removed before said next spool is set in said conveyor device; and said second station having said retainer device and said rotator device disposed therein, and said photo film path having said first and second sensors disposed therein.

11. A photo filmstrip winding apparatus as defined in claim 9, wherein said conveyor device intermittently moves between first, second and third stations in cyclic fashion;

said first station having said remover device disposed therein;

said second station having said spool supplier device disposed therein; and said third station having said retainer device, said rotator device disposed therein, and said photo film path having said first and second sensors disposed therein.

12. A photo filmstrip winding apparatus as defined in claim 9, wherein said conveyor device intermittently moves between first, second, third and fourth stations in cyclic fashion;

said first station having said remover device disposed therein;

said second station having said spool supplier device disposed therein;

said third station having a step retainer device disposed therein; and said fourth station having said rotator device disposed therein; and said first sensor being so disposed as to detect said rear end of said photo filmstrip wound in said fourth station.

13. A photo filmstrip winding apparatus as defined in claim 9, wherein said conveyor device intermittently moves between first, second, third, fourth and fifth stations in cyclic fashion;

said rotator device includes a high-speed rotator mechanism for rotating said spool at said high speed, and a low-speed rotator mechanism for rotating said spool at said low speed; and said first station having said remover device disposed therein;

said second station having said spool supplier device disposed therein;

said third station having said retainer device disposed therein;

said fourth station having said high-speed rotator mechanism disposed therein, said second sensor being so disposed as to detect said rear end of said photo filmstrip wound in said fourth station; and said fifth station having said low-speed rotator mechanism disposed therein, said first sensor being so disposed as to detect said rear end of said photo filmstrip wound in said fifth station.

14. A photo filmstrip winding method of winding a photo filmstrip about a spool, said photo filmstrip being different in a length from a front end to a rear end according to a strip type, said method comprising steps of:

(a) setting said spool in a conveyor device;

(b) intermittently moving said conveyor device between first, second, third, fourth and fifth stations in cyclic fashion, said first station being adapted to effecting said step (a);

(c) in said second station, retaining said front end on said spool;

(d) in said third station, winding said photo filmstrip about said spool at high speed by rotating said spool fast;

(e) during said step (d) in said third station, detecting said rear end at a first sensor, said first sensor being disposed a first distance away from said spool rotated in said step (d);

(f) in said third station, stopping said spool from rotating upon detecting said rear end in said step (e);

(g) in said fourth station, winding said photo filmstrip about said spool at low speed by rotating said spool slowly;

(h) during said step (g) in said fourth station, detecting said rear end at a second sensor, said second sensor being disposed a second distance away from said spool rotated in said step (g), where said second distance is shorter than said first distance;

(i) in said fourth station, stopping said spool from rotating upon detecting said rear end in said step (h), to regularize a length of an unwound portion of said photo filmstrip irrespective of said length of said photo filmstrip; and (j) removing said spool from said conveyor device after said step (i).

15. A photo filmstrip winding method of winding a photo filmstrip about a spool, said photo filmstrip being different in a length from a front end to a rear end according to a strip type, said method comprising steps of:

(A) retaining said front end on said spool;

(B) winding said photo filmstrip about said spool at high speed by rotating said spool fast;

(C) after said step (B), winding said photo filmstrip about said spool at low speed by rotating said spool slowly;

(D) during said step (C), detecting said rear end at a first sensor, said first sensor being disposed a first distance away from said spool rotated in said step (C);

(E) stopping said spool from rotating upon detecting said rear end in said step (D), to regularize a length of an unwound portion of said photo filmstrip irrespective of said length of said photo filmstrip;

(F) setting said spool in a conveyor device;

(G) removing said spool from said conveyor device after said step (E), said spool having said photo filmstrip wound thereabout;

(H) intermittently moving said conveyor device between first, second, third, fourth and fifth stations in cyclic fashion, said first station being adapted to effecting said step (G), said second station being adapted to effecting said step (F), said third station being adapted to effecting said step (A), said fourth station being adapted to effecting said step (B), and said fifth station being adapted to effecting said steps (C), (D) and (E).

16. A photo filmstrip winding apparatus for winding a photo filmstrip about a spool, said photo filmstrip being supplied in advancement of a front end thereof through a photo film path, and being different in a length from said front end to a rear end according to a strip type, said apparatus comprising:

a retainer device, disposed in an exit of said photo film path, for retaining said front end on said spool;

a rotator device for rotating said spool with said front end retained thereon;

a first sensor, disposed a first distance away from said spool rotated, for detecting said rear end being passed, to generate a detecting signal;

a controller for controlling rotation of said rotator device, said controller causing said rotator device to rotate fast to rotate said spool at high speed in a winding direction, subsequently said controller changing over speed of said rotator device to rotate said spool at low speed in said winding direction, said controller stopping said rotator device upon occurrence of said detecting signal while said spool is rotated slowly, to regularize a length of an unwound portion of said photo filmstrip irrespective of said length of said photo filmstrip;

a conveyor device for supporting and conveying said spool wherein said conveyor device intermittently moves between first, second, third, fourth and fifth stations in cyclic fashion;

a remover device for removing said spool from said conveyor device, said spool having said photo filmstrip wound thereabout;

a spool supplier device for setting a next spool on said conveyor device after removing said spool;

said rotator device includes a high-speed rotator mechanism for rotating said spool at said high speed, and a low-speed rotator mechanism for rotating said spool at said low speed; and said first station having said remover device disposed therein;

said second station having said spool supplier device disposed therein;

said third station having said retainer device disposed therein;

said fourth station having said high-speed rotator mechanism disposed therein, said second sensor being so disposed as to detect said rear end of said photo filmstrip wound in said fourth station; and said fifth station having said low-speed rotator mechanism disposed therein, said first sensor being so disposed as to detect said rear end of said photo filmstrip wound in said fifth station.

* * * * *